United States Patent
Klinger et al.

(10) Patent No.: US 12,202,409 B2
(45) Date of Patent: Jan. 21, 2025

(54) METHOD FOR DISPLAYING THE SURROUNDINGS OF A VEHICLE ON A DISPLAY DEVICE, PROCESSING UNIT AND VEHICLE

(71) Applicant: ZF CV Systems Global GmbH, Bern (CH)

(72) Inventors: Tobias Klinger, Springe (DE); Ralph-Carsten Lülfing, Garbsen (DE)

(73) Assignee: ZF CV Systems Global GmbH, Bern (CH)

( * ) Notice: Subject to any disclaimer, the term of this patent is extended or adjusted under 35 U.S.C. 154(b) by 84 days.

(21) Appl. No.: 18/172,852

(22) Filed: Feb. 22, 2023

(65) Prior Publication Data
US 2023/0226977 A1    Jul. 20, 2023

Related U.S. Application Data

(63) Continuation of application No. PCT/EP2021/073924, filed on Aug. 31, 2021.

(30) Foreign Application Priority Data

Sep. 2, 2020 (DE) ...................... 10 2020 122 908.9

(51) Int. Cl.
*B60R 1/23* (2022.01)
*G06T 7/50* (2017.01)
*H04N 23/698* (2023.01)

(52) U.S. Cl.
CPC .................. *B60R 1/23* (2022.01); *G06T 7/50* (2017.01); *H04N 23/698* (2023.01);
(Continued)

(58) Field of Classification Search
CPC .... B60R 1/23; B60R 1/27; B60R 1/31; B60R 2300/105; B60R 2300/60; G06T 7/50;
(Continued)

(56) References Cited

U.S. PATENT DOCUMENTS 6,923,080 B1    8/2005  Dobler et al.
8,451,107 B2 *  5/2013  Lu ..................... G06T 11/00
                                            353/77
(Continued)

FOREIGN PATENT DOCUMENTS

DE         100 35 223 A1     1/2002
DE   10 2015 105 248 A1    10/2015
(Continued)

OTHER PUBLICATIONS

International Search Report of the European Patent Office dated Jan. 7, 2022 for international application PCT/EP2021/073924 on which this application is based.

(Continued)

*Primary Examiner* — Brian P Yenke
(74) *Attorney, Agent, or Firm* — Walter Ottesen, P.A.

(57) ABSTRACT

A method for displaying an environment of a vehicle on a display includes: recording the environment with at least two cameras, each having a different field of view, wherein fields of view of adjacent cameras overlap; creating a panoramic image from at least two images taken by differing cameras, the images being projected into a reference plane for creating the panoramic image; ascertaining depth information pertaining to an object in the environment by triangulation from at least two differing individual images taken by the same camera; and generating an overlay structure as a function of the ascertained depth information, the overlay structure having been uniquely assigned to an imaged object; and, representing the created panoramic image, containing the at least one object, and the at least one generated overlay structure on the display such that the overlay structure is displayed on, and/or adjacent to, the assigned object.

21 Claims, 4 Drawing Sheets

(52) U.S. Cl.
CPC ..... *B60R 2300/105* (2013.01); *B60R 2300/60* (2013.01); *G06T 2207/30248* (2013.01)

(58) Field of Classification Search
CPC .... G06T 7/55; G06T 7/70; G06T 7/97; G06T 2207/30248; G06T 7/797; H04N 23/698; H04N 25/705
See application file for complete search history.

(56) References Cited

U.S. PATENT DOCUMENTS

| | | | |
|---|---|---|---|
| 10,979,633 B1* | 4/2021 | Blanchet | H04N 23/45 |
| 11,245,858 B2* | 2/2022 | Lee | H04N 23/958 |
| 2005/0128196 A1* | 6/2005 | Popescu | G06T 7/521 |
| | | | 345/420 |
| 2012/0229628 A1* | 9/2012 | Ishiyama | H04N 13/239 |
| | | | 348/135 |
| 2013/0332066 A1* | 12/2013 | Jeung | G01C 21/3602 |
| | | | 701/420 |
| 2014/0063235 A1* | 3/2014 | Taya | G06T 7/55 |
| | | | 348/140 |
| 2014/0225977 A1* | 8/2014 | Vilcovsky | G06Q 50/00 |
| | | | 348/14.07 |
| 2015/0286878 A1 | 10/2015 | Molin et al. | |
| 2018/0165524 A1 | 6/2018 | Molin et al. | |
| 2018/0288397 A1* | 10/2018 | Lee | H04N 13/204 |
| 2019/0026958 A1* | 1/2019 | Gausebeck | H04N 13/10 |
| 2020/0057488 A1 | 2/2020 | Johnson et al. | |
| 2020/0103909 A1 | 4/2020 | Feinson et al. | |
| 2020/0322585 A1* | 10/2020 | Tsunashima | H04N 13/111 |
| 2022/0019815 A1 | 1/2022 | Molin et al. | |
| 2022/0398852 A1* | 12/2022 | Dieckmann | G06V 10/761 |
| 2022/0414927 A1* | 12/2022 | Ricke | B60R 11/04 |
| 2023/0245409 A1* | 8/2023 | Ui | G06T 7/90 |
| | | | 345/419 |
| 2023/0419542 A1* | 12/2023 | Klinger | B60R 1/28 |
| 2024/0130291 A1* | 4/2024 | Christiansen | B60R 1/28 |
| 2024/0177495 A1* | 5/2024 | Dieckmann | G06V 10/761 |

FOREIGN PATENT DOCUMENTS

| | | |
|---|---|---|
| DE | 10 2017 108 254 A1 | 10/2017 |
| DE | 10 2016 223 388 A1 | 5/2018 |
| DE | 10 2018 100 909 A1 | 7/2019 |
| EP | 3 293 700 A1 | 3/2018 |

OTHER PUBLICATIONS

English translation and Written Opinion of the International Searching Authority dated Jan. 7, 2022 for international application PCT/EP2021/073924 on which this application is based.

* cited by examiner

| A1 | panoramic algorithm | RBPp | pth panoramic-image image point |
| 4R | panoramic field of view | RB | panoramic image |
| EBk | kth individual image taken by the camera 3 | RE | reference plane |
| EBkPi | ith individual-image image point of the kth individual image EBk | SfM | structure-from-motion |
| MP1 | feature point in the first individual image EB1 | TI | depth information |
| MP2 | feature point in the second individual image EB2 | T | triangulation |
| Ni | number of individual-image image points EBkPi | xB, yB | image coordinates |
| Np | number of panoramic-image image points RBPp | | |

METHOD FOR DISPLAYING THE SURROUNDINGS OF A VEHICLE ON A DISPLAY DEVICE, PROCESSING UNIT AND VEHICLE

CROSS-REFERENCE TO RELATED APPLICATIONS

This application is a continuation application of international patent application PCT/EP2021/073924, filed Aug. 31, 2021, designating the United States and claiming priority from German application 10 2020 122 908.9, filed Sep. 2, 2020, and the entire content of both applications is incorporated herein by reference.

TECHNICAL FIELD

The disclosure relates to a method for displaying an environment of a vehicle, in particular a utility vehicle, on a display device, to a processing unit for carrying out the method, and also to a vehicle.

BACKGROUND

From the prior art it is known to create panoramic images from individual images taken by several cameras, and to present them to an occupant on a display device. For this purpose, it is known to project the individual images onto a reference plane, for instance a horizontal plane underneath the vehicle, to rotate them appropriately, and to create a combined panoramic image therefrom. A disadvantageous aspect of this method is that raised objects that project from the reference plane at a specific height are represented tilted backward in the panoramic image, and as a result are distorted in their proportions. As a result, these objects are not capable of being intuitively interpreted geometrically by the observer. An orientation with reference to the panoramic image is thereby rendered difficult.

This effect can be minimized by a height of the captured objects being ascertained by additional sensors, and by the distortion in the proportions being compensated with this additional height information. In this case it is disadvantageous that additional sensors of such a type are not present in all vehicles, and/or that additional sensors are expensive. In addition, the computation effort is increased.

By way of example, in DE 10 2017 108 254 B4 it is described how to create an image composed of individual images, and to represent the image on a display. In this case, the individual images are each recorded by several cameras. By triangulation of two or more images, depth information with respect to the object—in particular, a position of the object—can be ascertained. The objects can, in addition, be temporally tracked.

According to US 2015/0286878, US 2018/0165524 and US 2022/0019815, there is provision to arrange, on a bipartite vehicle, a first camera on a first partial vehicle and a second camera on a second partial vehicle. A first image from the first camera and a second image from the second camera are projected onto a ground plane or reference plane via a homography matrix before the first image and the second image are rotated in order to generate a combined image of the environment therefrom.

In U.S. Pat. No. 6,923,080 it is described how to create an overall image or panoramic image from several individual images, and to project the vehicle itself into the panoramic image as an artificial graphic object or overlay structure.

In EP 3 293 700 B1 it is described how to reconstruct parts of the environment from several individual images taken by a camera via a structure-from-motion (SfM) method, and hence to ascertain depth information relating to individual objects. In this case, a quality metric is ascertained, in order to obtain an optimal reconstruction of the environment. By combining several cameras or individual images, this can also be done in a panoramic view.

In DE 10 2018 100 909 A1 it is described how to obtain a reconstruction of the current environment via the structure-from-motion method, and to classify or categorize objects in a neural network.

It is an object of the disclosure to specify a method for displaying an environment of a vehicle on a display device that can be carried out with little hardware effort and computation effort and that enables an easy orientation in the environment for an observer.

This object is, for example, achieved by a method for displaying an environment of a vehicle on a display device. The method includes: recording the environment with at least two cameras, wherein each of the at least two cameras has a different field of view, wherein the fields of view of adjacent ones of the at least two cameras overlap at least in some regions; generating a panoramic image from at least two individual images, wherein each of the at least two individual images has been recorded by a different one of the at least two cameras, and the at least two individual images are projected into a reference plane for generating the panoramic image; ascertaining depth information pertaining to at least one object in the recorded environment, wherein the depth information is ascertained by triangulation from at least two differing individual images taken by a same one of the at least two cameras, wherein the at least one object has been imaged in the at least two differing individual images; generating at least one overlay structure as a function of the ascertained depth information, wherein each of the at least one overlay structures has been uniquely assigned to one of the at least one object; and, presenting the generated panoramic image, containing the at least one object, and the at least one generated overlay structure on the display device such that the at least one overlay structure is displayed at least at one of on and adjacent to, the uniquely assigned one of the at least one object.

It is a further object of the disclosure to specify a processing unit for displaying an environment of a vehicle on a display device that can be carried out with little hardware effort and computation effort and that enables an easy orientation in the environment for an observer.

This object is, for example, achieved by a processing unit configured to perform the above-mentioned method.

It is a further object of the disclosure to specify a vehicle configured to display an environment of the vehicle on a display device that can be carried out with little hardware effort and computation effort and that enables an easy orientation in the environment for an observer.

This object can, for example, be achieved by a vehicle including: at least two cameras each having a different field of view, wherein the fields of view of adjacent ones of the at least two cameras overlap at least in some regions; a display device; a processing unit configured to perform the above method, the display device being configured to represent a created panoramic image, containing at least one object, and at least one generated overlay structure such that the at least one overlay structure is displayed at least at one of on and adjacent to the uniquely assigned one of the at least one object.

In accordance with an embodiment of the disclosure, a method for displaying an environment of a vehicle on a display device includes:

First of all, the environment around the vehicle is recorded, in particular in a near region, with at least two cameras, each camera having a different field of view, with fields of view of adjacent cameras overlapping at least in some regions, in particular at the edges. A panoramic image is subsequently created from the individual images ascertained thereby, each individual image having been recorded by a different camera at approximately the same time, and the individual images being projected into a reference plane, for instance by a homography matrix, for the purpose of creating the panoramic image.

Accordingly, a three-dimensional panoramic image is not created from the individual images, but rather a panoramic image is created in which the environment is represented as a two-dimensional projection by appropriate combination of the individual images. As a result, given appropriate arrangement and orientation of the cameras, a view of the environment from a bird's-eye perspective is made possible when the panoramic image is displayed on the display device.

In a further step of the method according to the disclosure, depth information from at least one object in the recorded environment is ascertained, the depth information being ascertained, preferably by a so-called structure-from-motion method, by triangulation from at least two differing individual images taken by the same camera, the at least one object having been imaged in the at least two differing individual images, preferably from at least two differing viewpoints. Accordingly, recourse is not had to a stereo camera system for the purpose of ascertaining the depth information. Rather, a perspective reconstruction of the environment or of the object is obtained merely by image-processing of the individual images taken by a camera, from which the depth information can be derived.

Depending on the depth information previously ascertained by the SfM method, at least one overlay structure is generated, each overlay structure having been uniquely assigned to an imaged object. In a further step, the representing of the created panoramic image, containing the at least one object, and of the at least one generated overlay structure on the display device is undertaken in such a way that the at least one overlay structure is displayed on, and/or adjacent to, the respectively assigned object.

Therefore an overlay structure can advantageously be represented on the display device without additional sensors, merely on the basis of image-processing methods, in particular the structure-from-motion method. By recourse to the previously ascertained depth information, this overlay structure can be represented purposefully at the position, or adjacent to the position, on the display device at which the object has also been represented. Even if the respective object in the panoramic image is represented on the display device in a manner not capable of being intuitively interpreted geometrically, the overlay structure can contribute toward ensuring that a reliable orientation with reference to the panoramic image can be undertaken, since the overlay structure reinforces or highlights the essential information with respect to an object on the display device. A distortion of raised objects in the panoramic image, by reason of the projection into the reference plane, can thereby be at least compensated.

Additionally, by virtue of the representation of the overlay structure, the problem that objects in the overlapping regions of individual images taken by two adjacent cameras frequently "disappear" or cannot be perceived sufficiently can be eliminated, since these objects are tilted backward in the respective camera perspective and, as a rule, do not appear at all in the panoramic image or can be perceived at least insufficiently. In the overlay structures, however, such an object is contained in accordance with the method described above and is therefore also represented in the panoramic image.

For this purpose there may preferably be provision that a bar and/or a polygon and/or a text is/are displayed as overlay structure on the display device on, and/or adjacent to, the respectively assigned object. Accordingly, simple structures that are sufficient for a highlighting of objects for the purpose of orientation can be displayed as superimposition. For instance, merely a bar may have been provided which is displayed on the display device on, and/or adjacent to, an outer edge of the respectively assigned object, the bar preferably being perpendicular to an object normal of the respectively assigned object, in which connection the object normal can be acquired from the depth information. In this case, an outer boundary of the respective object is preferably understood as the outer edge, the bar or the respective overlay structure being superimposed at least on the outer edge or boundary that is closest to the ego vehicle. As a result, by virtue of a bar, a boundary of the object in the direction of the ego vehicle can be made evident on the panoramic image. As a result, the observer can unambiguously discern the point in space up to which the ego vehicle can be maneuvered or positioned without touching the object, for instance in the course of a parking or maneuvering procedure.

In addition to or as an alternative to the bar, there may preferably be provision that a polygon is imaged as overlay structure on the display device in such a way that the polygon spans the respectively assigned object at least partially, preferably completely. As a result, not only the boundary of the respective object in the direction of the ego vehicle can be displayed to the observer of the display device, but the extent of the object can also be made evident, so that the object is highlighted even more clearly on the display device. If an object contour and/or an object shape of the respective object is/are known from the reconstruction of the environment via the SfM method, the polygon can also be adapted to this object contour or object shape. If the object contour and the object shape are not known, a rectangle, for instance, that covers the object points of the respective object imaged in the panoramic image can be assumed as a polygon.

There may preferably be provision, furthermore, that the at least one overlay structure is displayed on the display device in a color established in advance or in a color that is dependent on the ascertained depth information with respect to the respectively assigned object. As a result, information with respect to the spatial characteristics of the object can be given to the observer in addition by virtue of a color coding. Preferably in this case, there may be provision that the color of the at least one overlay structure is dependent on an object distance between the vehicle and the respectively assigned object, the object distance being acquired from the ascertained depth information with respect to the respectively assigned object. As a result, an overlay structure that is further away from the ego vehicle on the display device can, for instance, be given a color that indicates a low danger, for instance a green color. An overlay structure that, on the other hand, is located closer to the ego vehicle on the display device can be given a color that indicates a higher danger, for instance a red color. In this connection, arbitrary color gradations are possible, depending on the object distance.

There may preferably be provision, furthermore, that the color and/or the type of the overlay structure of the respective object is/are dependent on a motion-indicator assigned to the object, the motion-indicator specifying whether the respective object is able to move—for example, a person or a vehicle—or is permanently stationary—for instance, a building or a street light, the motion-indicator being acquired from the ascertained depth information with respect to the respectively assigned object. As a result, the additional danger that may emanate from the displayed object by reason of a potential motion can additionally be highlighted on the display device if this object is not directly unambiguously discernible on the panoramic image by reason of the distortion.

For this purpose, there may preferably be provision that an object contour and/or an object shape of the respectively assigned object is/are ascertained from the depth information, and a motion-indicator for the object in question is derived from the object contour and/or from the object shape via a deep-learning algorithm by comparison with known object contours and/or object shapes. As a result, a computationally elaborate object tracking can be dispensed with, and instead recourse may be had to the comparison of known objects in a database which has been stored in the vehicle or which can be accessed from the vehicle via an appropriate data link.

Alternatively or additionally (for the purpose of checking plausibility), however, there may also be provision that object points, imaged in the individual images, on the object are temporally tracked, in order to derive the motion-indicator for the object in question. Accordingly, it can be ascertained—for instance, by the forming of difference images—how individual-image image points behave temporally, and a motion of the object can be inferred therefrom.

There may preferably be provision, furthermore, that the at least one overlay structure is displayed opaquely or at least partially transparently on the display device, so that the at least one overlay structure completely or at least partially, related to the transparency, covers the panoramic image on, and/or adjacent to, the respectively assigned object. As a result, although the respective object can be highlighted by the overlay structure, the observer can simultaneously be given the possibility of still discerning the object located behind it, in order, where appropriate, to check the plausibility himself/herself of the danger that may emanate from the object. Advantageously, the transparency of the overlay structure can also be established in a manner similar to the color coding, depending on the depth information with respect to the object. For instance, objects having a greater object distance from the vehicle can be displayed with a greater transparency than objects having a short object distance from the vehicle, as a result of which more-relevant objects are highlighted more intensely.

There can preferably be provision, furthermore, that the display device exhibits display pixels, panoramic image points of the panoramic image being displayed on the display pixels of the display device, in which connection an object contained in the panoramic image is present on object pixels, the object pixels being a subset of the display pixels, the overlay structure assigned to the respective object being displayed or superimposed on, and/or adjacent to, the respective object pixels on the display device. The superimposition of the overlay structures is preferably undertaken by an overlay image with at least one overlay structure being superimposed on the panoramic image with the at least one object on the display device in such a way that the overlay structure assigned to the respective object is displayed on the display device on, and/or adjacent to, the respective object pixels.

Accordingly, a preprocessing is firstly carried out on the basis of the depth information in such a way that an overlay image is created in which the overlay structures are represented, preferably exclusively, at the positions at which, or adjacent to which, the objects have been imaged in the panoramic image. By an addition or multiplication, or by an arbitrary different operation, these two images can then be displayed simultaneously on the display device, in order to obtain the superimposition according to the disclosure.

Alternatively or additionally, however, there may also be provision that the panoramic image itself contains the at least one overlay structure, the panoramic image being adapted in such a way for this purpose at, and/or adjacent to, the panoramic image points on which an object has been imaged that the overlay structure assigned to the respective object is displayed on the display device on, and/or adjacent to, the respective object pixels. So in this case only one image is communicated to the display device for the purpose of representation, which is appropriately "furnished" in advance with the overlay structures, by the image points being "manipulated" appropriately in order to represent the overlay structures in this image.

There can preferably be provision, furthermore, that the at least two individual images from which the depth information is ascertained by triangulation are recorded from at least two differing viewpoints by the same camera, the depth information being ascertained by triangulation as a function of a base length between the at least two viewpoints. As a result, a reliable ascertainment of the depth information within the scope of the SfM method can be ensured. Preferably in this case, there may be provision that the camera is brought into the differing viewpoints by a motion of the vehicle itself—that is, by a change in the running dynamics of the vehicle—or alternatively by an active adjustment of the camera without a change in the running dynamics of the vehicle.

There can preferably be provision, furthermore, that the environment is mapped within a panoramic region in the panoramic image, the panoramic region being larger than the fields of view of the individual cameras, a viewing angle of the panoramic region amounting to 360°, and the panoramic image being made of at least two individual images taken by differing cameras, recorded at approximately the same time. Hence a preferably gapless mapping of the entire environment around the vehicle at the current time and a superimposition of overlay structures for the entire panoramic field of view are made possible.

There can preferably be provision, furthermore, that isolines, assigned to the vehicle, are represented on the display device as a further overlay structure, the isolines being displayed at fixed isodistances from a vehicle exterior of the ego vehicle. Hence the vehicle itself may also be regarded as an object to which overlay structures have been assigned, on the basis of which the observer is able to orientate himself/herself. The position of the isolines is dependent on the spatial information that is ascertained via the individual images. For instance, the isolines can be represented at intervals of 1 m around the ego vehicle. Depending on the isodistance, the overlay structures can also be color-coded with color gradations, so that isolines located closer to the vehicle are represented in red, and isolines located further away are represented in green, with an appropriate color gradient for isolines located in between. The transparency of the isolines may also vary as a function of the isodistance, in order to make the distances from the vehicle evident for the observer in a straightforward manner.

A vehicle according to the disclosure, in which the method according to the disclosure is capable of being carried out, accordingly exhibits at least two cameras, each camera having a different field of view, fields of view of adjacent cameras overlapping at least in some regions, in particular at the edges. Furthermore, a display device and also a processing unit according to the disclosure have been provided in the vehicle, the display device having been configured to represent a created panoramic image, containing at least one object, and at least one generated overlay structure—as part of the panoramic image or as a separate overlay image—in such a way that the at least one overlay structure is displayed on, and/or adjacent to, the respectively assigned object.

Preferably in this connection there is provision that each individual camera has a field of view with a viewing angle greater than or equal to 120°, in particular greater than or equal to 170°, the camera taking the form, for instance, of a fisheye camera which has been arranged on at least two sides of the vehicle, selected from the group including a front side, a rear side or at least one long side. With arrangements of such a type, given an appropriate viewing angle an almost gapless recording of the environment is possible, in order to represent the latter in a bird's-eye perspective. For this purpose, the individual cameras have preferably been oriented toward a near region of the environment—that is, toward the ground-in order to enable a representation in a bird's-eye perspective.

BRIEF DESCRIPTION OF DRAWINGS

The invention will now be described with reference to the drawings wherein.

DETAILED DESCRIPTION

Figure 1:
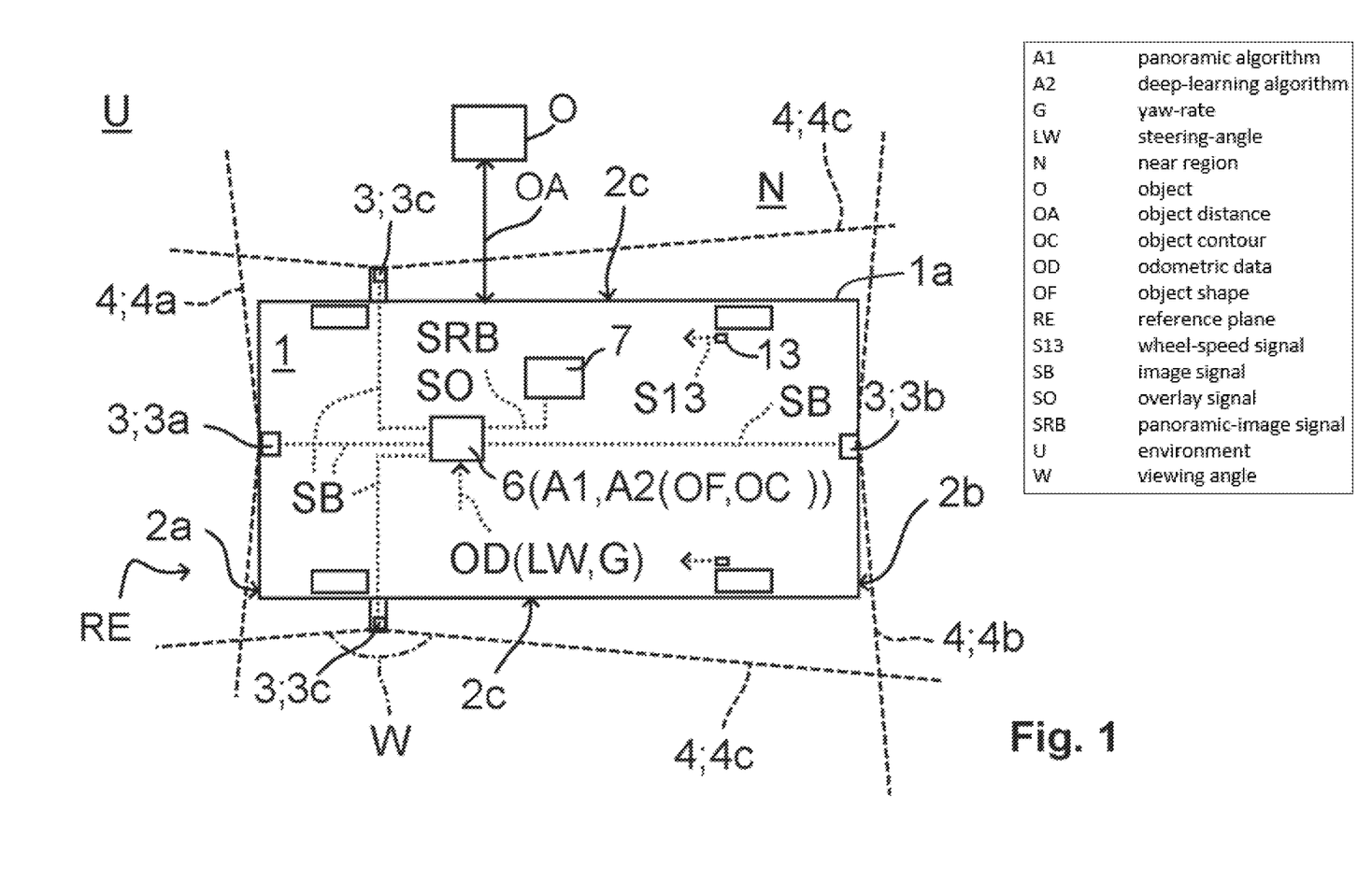
FIG. 1 shows a schematic of a vehicle for carrying out the method according to the disclosure.

In FIG. 1, a vehicle 1, in particular a utility vehicle, is represented schematically which, according to the embodiment shown, exhibits a front camera 3a on a front side 2a, for instance in the headliner, and a rear-compartment camera 3b on a rear side 2b. Furthermore, side cameras 3c have been arranged on long sides 2c of the vehicle 1, for instance on the mirrors. Further cameras 3, not represented, may also have been provided in the vehicle 1, in order to capture an environment U, in particular a near region N (environment up to 10 m away from the vehicle 1).

Each camera 3 has a field of view 4, a front field of view 4a of the front camera 3a being oriented forward, a rear-compartment field of view 4b of the rear-compartment camera 3b being oriented rearward, and a side field of view 4c of the side cameras 3c being oriented toward the respective side of the vehicle 1. In order to be able to capture the relevant part of the environment U, in particular the near region N, the cameras 3 have been oriented toward the ground on which the vehicle 1 is moving.

The number and the position of the cameras 3 have preferably been chosen in such a way that the fields of view 4 of adjacent cameras 3 intersect in the near region N, so that all the fields of view 4 together are able to cover the near region N in gapless manner and hence over its entire area. For this purpose, the cameras 3 may each have been realized as, for example, fisheye cameras which can each cover a field of view 4 with a viewing angle W equal to or greater than 170°.

Figure 2:
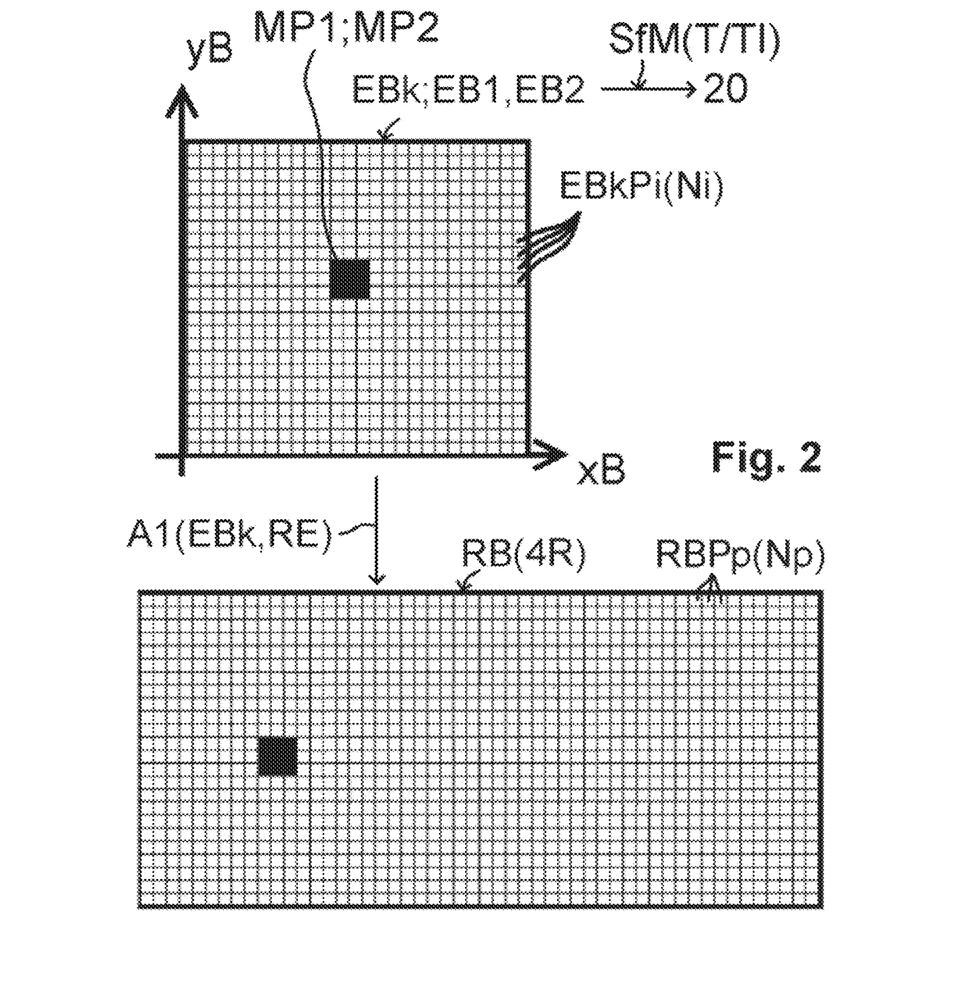
FIG. 2 shows a detailed view of the individual images recorded.

Each camera 3 outputs image signals SB that characterize the environment U imaged on the sensor of the respective camera 3 in the field of view 4. The image signals SB are output to a processing unit 6, the processing unit 6 having been configured to generate individual images EBk (serial index k) on the basis of the image signals SB for each camera 3. According to FIG. 2, the kth individual image EBk exhibits a number Ni of individual-image image points EBkPi (serial index i from 0 to Ni) on which the environment U has been mapped. According to FIG. 2A, object points PPn (serial index n), which pertain to an object O in the environment U, have been assigned to specific individual-image image points EBkPi.

By projection of the individual images EBk into a reference plane RE, for instance a horizontal plane underneath the vehicle 1 (cf. a plane parallel to the plane spanned by xO and yO in FIG. 2A), a panoramic image RB with a number Np of panoramic-image image points RBPp (serial index p from 0 to Np) is created in the processing unit 6 from the individual images EBk of differing cameras by a perspective transformation, for example as a function of a homography matrix, via a panoramic algorithm A1. In the panoramic image RB, the environment U around the vehicle 1 has been mapped in gapless manner on all sides, at least in the near region N (cf. FIG. 3), corresponding to a viewing angle W of 360°. Therefore a panoramic field of view 4R, which is larger than the individual fields of view 4 of the cameras 3, arises for the panoramic image RB. This panoramic image RB of the near region N can be output to an occupant, for instance to the driver of the vehicle 1, on a display device 7, so that the driver is able to orientate himself/herself thereby, for instance in the course of a parking procedure or a maneuvering procedure. As a result, the environment U can be presented to the observer in a bird's-eye perspective.

Figure 2A:
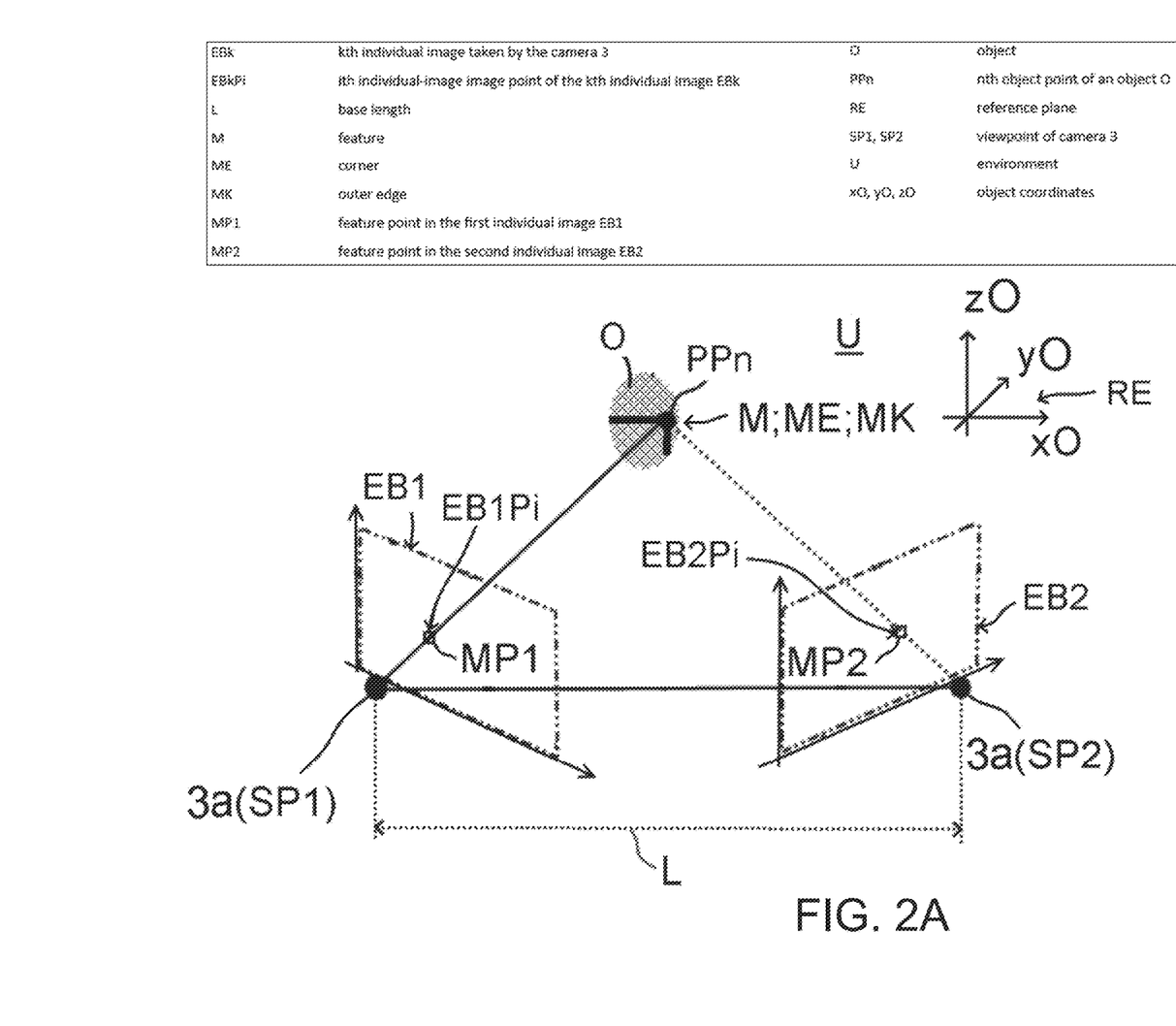
FIG. 2A shows a detailed view of an object imaged in two individual images taken by a single camera.
Figure 2B:
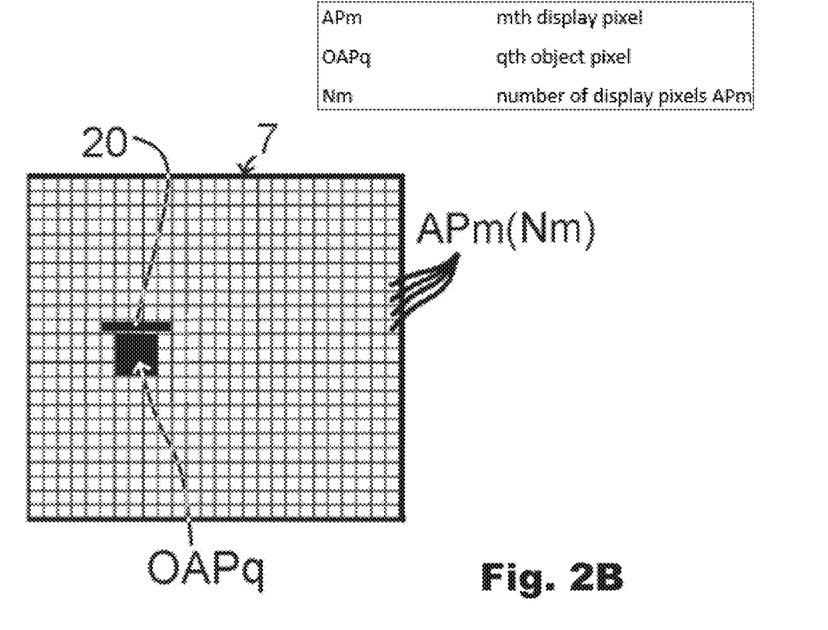
FIG. 2B shows a detailed view of a display device in the vehicle according to FIG. 1; and, FIG. 3 shows a detailed view of the environment displayed on the display device.

According to FIG. 2B, the display device 7 exhibits a number Nm of display pixels APm (serial index m from 0 to Nm), each panoramic-image image point RBPp being represented on a specific display pixel APm of the display device 7, so that the panoramic image RB arises which is visible for the observer on the display device 7. A dynamic subset of the display pixels APm is constituted by object pixels OAPq (serial index q) on which an object O from the environment U is represented (merely schematically in FIG. 2B). So panoramic-image image points RBPp on which a specific object O from the environment U or a specific object point PPn is imaged have been assigned to the object pixels OAPq.

In a representation of such a type, it may happen, by reason of the application of the panoramic algorithm A1, that distortions arise at the edges of the panoramic image RB. In order to counter this, in accordance with the disclosure there is provision that further information, which results from depth information TI relating to the imaged objects O, is superimposed on the created panoramic image RB.

The depth information TI is acquired with the so-called structure-from-motion (SfM) method from several individual images EBk taken by a single camera 3. So the extracting of depth information TI is undertaken in camera-specific manner for each camera 3 individually. In the course of the SfM method, the three-dimensional object O in question in the environment U, with its object points PPn, is recorded by the respective camera 3 from at least two differing viewpoints SP1, SP2, as represented in FIG. 2A. By triangulation T, the depth information TI with respect to the respective three-dimensional object O can subsequently be obtained:

For this purpose, image coordinates xB, yB relating to at least one first individual-image image point EB1P1 in a first individual image EB1, for example taken by the front camera 3a, and to at least one first individual-image image point EB2P1 in a second individual image EB2, likewise taken by the front camera 3a, are determined. Both individual images EB1, EB2 are recorded by the front camera 3a at differing viewpoints SP1, SP2—that is, the vehicle 1—or, to be more exact, the front camera 3a—moves by a base length L between the individual images EB1, EB2. The two first individual-image image points EB1P1, EB2P1 are chosen in the respective individual images EB1, EB2 in such a way that they have been assigned to the same object point PPn on the respectively imaged three-dimensional object O.

In this way, in each instance one or more pairs of individual-image image points EB1Pi, EB2Pi for one or more object points PPn can be ascertained for one or more objects O in the environment U. In order to simplify the process, a certain number of individual-image image points EB1Pi, EB2Pi in the respective individual image EB1, EB2 can be combined in a feature point MP1, MP2 (see FIG. 2), the individual-image image points EB1Pi, EB2Pi to be combined being chosen in such a way that the respective feature point MP1, MP2 has been assigned to a specific uniquely localizable feature M on the three-dimensional object O. The feature M may be, for instance, a corner ME or an outer edge MK on the three-dimensional object O (cf. FIG. 2A).

In an approximation, the absolute, actual object coordinates xO, yO, zO (world coordinates) of the three-dimensional object O or of the object point PPn or of the feature M can subsequently be calculated or estimated by triangulation T from the image coordinates xB, yB of the individual-image image points EB1Pi, EB2Pi or of the feature points MP1, MP2 ascertained for the respective object O. In order to be able to execute the triangulation T, recourse is had to an appropriately ascertained base length L between the viewpoints SP1, SP2 of the front camera 3a.

From the object coordinates xO, yO, zO ascertained therefrom, both a position and an orientation—that is, a pose—of the vehicle 1 relative to the respective three-dimensional object O can subsequently be ascertained from geometric considerations if the triangulation T was carried out for a sufficient number of object points PPn or features M of an object O. On this basis, an object shape OF and/or an object contour OC can be at least estimated by the processing unit 6 if the exact object coordinates xO, yO, zO of several object points PPn or features M of an object O are known. The object shape OF and/or the object contour OC can be supplied to a deep-learning algorithm A2 for later processing.

In the described manner, objects O and the object coordinates xO, yO, zO thereof can also be captured by any other camera 3 in the vehicle 1, and via these the position and orientation thereof in space can be ascertained.

In order to ascertain the depth information TI still more precisely, there may additionally be provision that more than two individual images EB1, EB2 are recorded with the respective camera 3 and are evaluated by triangulation T as described above, and/or a bundle adjustment is additionally carried out.

As already described, the object O for the SfM method has to be viewed by the respective camera 3 from at least two differing viewpoints SP1, SP2, as represented schematically in FIG. 2A. For this purpose, the respective camera 3 has to be moved in controlled manner to the differing viewpoints SP1, SP2. On the basis of odometric data OD, the base length L between the viewpoints SP1, SP2 that results from this motion can be ascertained. Varying methods may find application for this purpose.

If the entire vehicle 1 is in motion, a motion of the respective camera 3 already results therefrom. By this, it is to be understood that the vehicle 1 as a whole is set in motion actively, for instance by the drive system, or passively, for instance by virtue of an incline. If during this motion at least two individual images EB1, EB2 are recorded by the respective camera 3 within a temporal offset, the base length L can be ascertained with the aid of odometric data OD, from which the motion of the vehicle and hence also the motion of the camera can be derived. So the two viewpoints SP1, SP2 assigned to the individual images EB1, EB2 are ascertained by odometry.

Wheel-speed signals S13 from active and/or passive wheel-speed sensors 13 on the wheels of the vehicle 1 can, for instance, be used as odometric data OD. From these signals, it can be ascertained, depending on the temporal offset, how far the vehicle 1 or the respective camera 3 has moved between the viewpoints SP1, SP2, from which the base length L follows. In order to make the odometric determination of the base length L more precise in the course of a motion of the vehicle 1, recourse may be had to further odometric data OD available in the vehicle 1. For instance, recourse may be had to a steering-angle LW and/or a yaw-rate G, which are determined appropriately by sensor means or analytically, in order to take also the rotary motion of the vehicle 1 into account.

However, it is not necessary to have recourse only to the odometry of the vehicle—that is, the evaluation of the motion of the vehicle on the basis of motion sensors on the vehicle 1. Additionally or alternatively, recourse may also be had to visual odometry. In the case of visual odometry, a camera position can be ascertained continuously from the image signals SB of the respective camera 3 or from information in the captured individual images EB1, EB2, insofar as object coordinates xO, yO, zO of a specific object point PPn, for example, are known, at least at the beginning. So the odometric data OD may also contain a dependency on the camera position ascertained in this way, since the motion of the vehicle between the two viewpoints SP1, SP2, or directly also the base length L, can be derived therefrom.

In principle, however, an active adjustment of the camera 3 without changing the state of motion of the entire vehicle 1 may also have been provided. Accordingly, any motions of the respective camera 3 are possible, in order to bring the latter into differing viewpoints SP1, SP2 in controlled and measurable manner.

Figure 3:
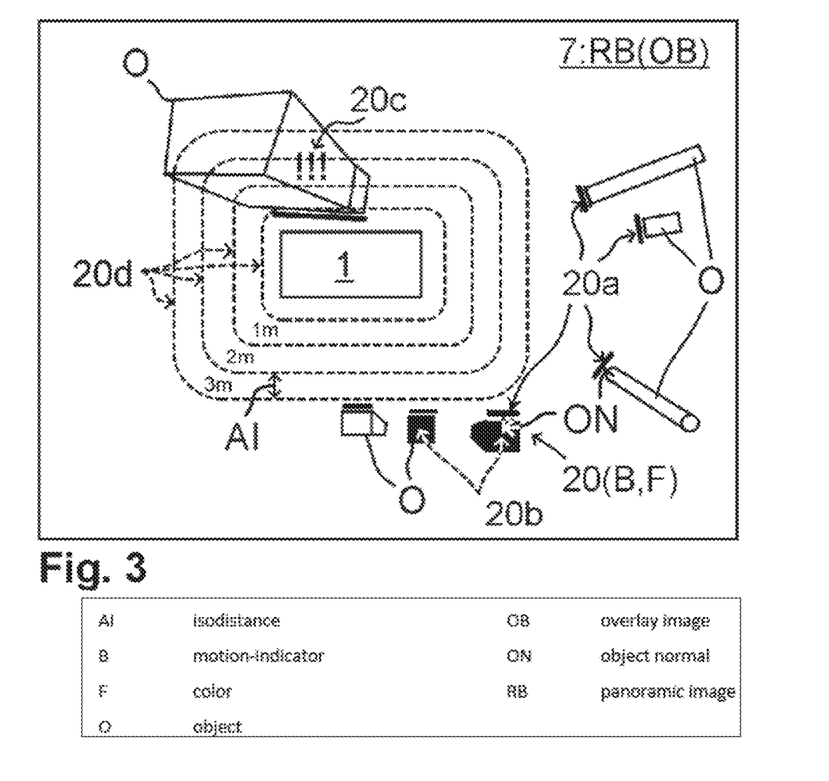

Depending on the depth information TI that could be ascertained by the SfM method relating to a specific object O, overlay structures 20 can subsequently be superimposed on the panoramic image RB, as represented in FIG. 3. The superimposition can be carried out in such a way that the panoramic image RB is communicated to the display device 7 via a panoramic-image signal SRB, and an overlay image OB, with the respective overlay structures 20, to be superimposed is communicated to the display device 7 via an overlay signal SO. The display device 7 then represents both images RB, OB on the corresponding display pixels APm, for instance by pixel addition or pixel multiplication or by an arbitrary different pixel operation. Alternatively, the panoramic image RB can also be changed or adapted directly in the processing unit 6 at the corresponding panoramic image points RBPp, so that via the panoramic-image signal SRB a panoramic image RB, which contains the overlay structures 20, is communicated to the display device 7 for the purpose of display.

The additional overlay structures 20 have been uniquely assigned to a specific object O in the environment U. As a result, additional information relating to the respective object O can be presented to the observer, making the orientation in the environment U with reference to the display more comfortable. For this purpose, the overlay structure 20 may be, for instance, a bar 20*a* and/or a polygon 20*b* and/or a text 20*c*, which additionally may have been coded, depending on the respectively assigned depth information TI.

The superimposition is undertaken in such a way that the overlay structure 20 appears on, or adjacent to, the object pixels OAPq of the display device 7 that have been assigned to the object O. The respective object pixels OAPq can be identified dynamically by the processing unit 6 via the panoramic algorithm A1. On this basis, the overlay image OB can be created, or the panoramic image points RBPp of the panoramic image RB can be directly changed or adjusted, so that the respective overlay structure 20 appears on, or adjacent to, the respective object O on the display device 7.

For instance, a bar 20*a* can be represented on the display pixels APm of the display device 7 that are located on, or adjacent to, an outer edge MK of the respective object O that is located closest to the ego vehicle 1. The orientation of the bar 20*a* can be chosen in such a way that the bar 20*a* is perpendicular to an object normal ON, as represented in FIG. 3, so that in each case the bar 20*a* specifies an outer boundary of the object O if the object O does not have, for instance, a rectilinear outer edge MK. The object normal ON can be estimated from the depth information TI relating to this object—that is, from the position and the orientation—that follows from the SfM method.

In order to highlight the position of a bar 20*a*, assigned to the object O, on the display device 7, the object pixels OAPq of the object O to which the bar 20*a* has also been assigned can be tinted in an established color F. As a result, the object O itself is represented more clearly, so that possible distortions in the representation of the object O are perceived less. So a polygon 20*b* with the object shape OF or with the object contour OC is superimposed in a specific color F on the panoramic image RB in the region of the object pixels OAPq as a further overlay structure 20. If the object shape OF or the object contour OC cannot be determined unambiguously in the SfM method, merely a rectangle for the object O can also be assumed, which then extends "behind" the bar 20*a*, viewed from the vehicle 1. The further overlay structure 20 in this case is a polygon 20*b* with four corners.

Black, for instance, can be chosen as color F. But the color F may also be chosen as a function of an object distance OA from the respective object O. The bar 20*a* itself may also have been color-coded as a function of the object distance OA from the respective object O. The object distance OA between the vehicle 1 and the object O follows likewise from the depth information TI relating to this object—that is, from the position and the orientation—acquired via the SfM method.

If an object distance OA of less than 1 m is ascertained in the SfM method, the color F of the respective overlay structure 20—that is, of the bar 20*a* and/or of the polygon 20*b*—can be represented, for instance, in a warning color, in particular in red. If the object distance OA of the object O lies within a range between 1 m and 5 m, yellow can be used as color F for the overlay structure 20 assigned to this object O. In the case of object distances OA greater than 5 m, green may have been provided as color F. In this way, the danger that emanates from the respective object O can be displayed to the observer in a clear manner. Since the depth information TI is acquired from the individual images EBk, the distortions resulting from the panoramic algorithm A1 have no influence on the overlay structures 20 and can therefore be represented at the correct position on the display device 7, proceeding from the ego vehicle 1.

Furthermore, the respective overlay structure 20 can be displayed on the display device 7 opaquely or at least partially transparently, so that the at least one overlay structure 20 completely or at least partially, in relation to the transparency, covers the panoramic image RB on, and/or adjacent to, the respectively assigned object O.

Additionally, the color F of the overlay structure 20 can be chosen as a function of a motion-indicator B. So an object contour OC and/or an object shape OF for the respectively detected object O can be ascertained on the basis of the SfM method as described. However, no direct inference as to a dynamic response of the object O can be made from the SfM method. But if the object contour OC and/or the object shape OF is/are supplied to a deep-learning algorithm A2 in the processing unit 6, at least a classification of the object O can take place, from which the possible dynamic response of the object O can then be inferred.

In this connection, the object contour OC and/or the object shape OF of the respective object O can be compared with known objects. These objects may have been saved in a database which for example, has been stored in a memory which is fixed to the vehicle or which is accessible from the vehicle 1 via a mobile data link. On the basis of the records of known objects in the database, it can be established whether the captured object O is a person or a building or a vehicle or similar. With the aid of this, to each captured object O a motion-indicator B saved in the database can be assigned which specifies whether and how the object O normally moves in the environment U. From this, it can be concluded whether increased attentiveness to the object O—for example, in the case of persons—is imperative.

Correspondingly, the overlay structure 20—for example, the bar 20*a* and/or the polygon 20*b* or a further overlay structure 20—can be coded, for instance color-coded, in accordance with the motion-indicator B. Additionally, a text 20*c*, for instance in the form of a "!" (exclamation-mark) et cetera, can be overlaid as a further overlay structure 20.

However, the motion-indicator B of an object O can also be estimated by individual-image image points EBkPi that have been assigned to an object point PPn in the environment U being temporally tracked. This can be done, for instance, by the pixelwise forming of a difference of consecutive individual images EBk. From this, a motion of the respective object O can likewise be inferred.

Furthermore, isolines 20*d* (see FIG. 3) can be superimposed as overlay structures 20, each of which characterizes a fixed isodistance A1 from a vehicle exterior 1*a*.

It is understood that the foregoing description is that of the preferred embodiments of the invention and that various changes and modifications may be made thereto without departing from the spirit and scope of the invention as defined in the appended claims.

LIST OF REFERENCE SYMBOLS (INTEGRAL PART OF THE DESCRIPTION)

1 vehicle
1a vehicle exterior
2a front side
2b rear side
2c long side
3 camera
3a front camera
3b rear-compartment camera
3c side camera
4 field of view
4a front field of view
4b rear-compartment field of view
4c side field of view
4R panoramic field of view
6 processing unit
7 display device
13 wheel-speed sensor
20 overlay structure
20a bar
20b polygon
20c text
20d isoline
A1 panoramic algorithm
A2 deep-learning algorithm
AI isodistance
APm mth display pixel
B motion-indicator
EBk kth individual image taken by the camera 3
EBkPi ith individual-image image point of the kth individual image EBk
F color
G yaw-rate
L base length
LW steering-angle
M feature
ME corner
MK outer edge
MP1 feature point in the first individual image EB1
MP2 feature point in the second individual image EB2
N near region
Ni number of individual-image image points EBkPi
Nm number of display pixels APm
Np number of panoramic-image image points RBPp
O object
OAPq qth object pixel
OA object distance
OB overlay image
OC object contour
OD odometric data
OF object shape
ON object normal
PPn nth object point of an object O
RB panoramic image
RBPp pth panoramic-image image point
RE reference plane
S13 wheel-speed signal
SB image signal
SO overlay signal
SP1, SP2 viewpoint of camera 3
SRB panoramic-image signal
TI depth information
T triangulation
U environment
xB, yB image coordinates
xO, yO, zO object coordinates
i, k, m, n, p, q index

The invention claimed is:

1. A method for displaying an environment of a vehicle on a display device, the method comprising:
recording the environment with at least two cameras, wherein each of the at least two cameras has a different field of view, wherein the fields of view of adjacent ones of the at least two cameras overlap at least in some regions;
generating a panoramic image as a two-dimensional projection from at least two individual images, wherein each of the at least two individual images has been recorded by a different one of the at least two cameras, and the at least two individual images are projected into a reference plane for generating the panoramic image;
ascertaining depth information pertaining to at least one object in the recorded environment via a structure-from-motion method, wherein the depth information is ascertained by triangulation from at least two differing individual images taken by a same one of the at least two cameras, wherein the at least one object has been imaged in the at least two differing individual images, wherein each of the at least two differing individual images are recorded at different positions of the vehicle when the vehicle is moved between two positions;
generating at least one overlay structure as a function of the ascertained depth information, wherein each of the at least one overlay structures has been uniquely assigned to one of the at least one object, wherein the at least one overlay structure is displayed on the display device in a color, wherein the color is dependent on the ascertained depth information with respect to the uniquely assigned one of the at least one object; and,
presenting the generated panoramic image, containing the at least one object, and the at least one generated overlay structure on the display device such that the at least one overlay structure is displayed at least at one of on and adjacent to, the uniquely assigned one of the at least one object.

2. The method of claim 1, wherein at least one of a bar, a polygon, and a text is displayed as the overlay structure on the display device.

3. The method of claim 2, wherein the bar is displayed at least at one of on and adjacent to an outer edge of the uniquely assigned one of the at least one object on the display device.

4. The method of claim 3, wherein the bar is perpendicular to an object normal of the uniquely assigned one of the at least one object, wherein the object normal is acquired from the depth information.

5. The method of claim 2, wherein the polygon is imaged on the display device as overlay structure such that the polygon spans the uniquely assigned one of the at least one object at least partially.

6. The method of claim 1, wherein the at least one overlay structure is displayed on the display device in a color established in advance.

7. The method of claim 6, wherein the color of the at least one overlay structure is dependent on an object distance between the vehicle and the uniquely assigned one of the at least one object; and, the object distance is acquired from the ascertained depth information with respect to the uniquely assigned one of the at least one object.

8. The method of claim 6, wherein at least one of the color and the type of the at least one overlay structure for the uniquely assigned one of the at least one object is dependent on a motion-indicator assigned to the at least one object; the motion-indicator specifies whether the at least one object is able to move or is permanently stationary; and, the motion-indicator is acquired from the ascertained depth information with respect to the uniquely assigned one of the at least one object.

9. The method of claim 8, wherein at least one of an object contour and an object shape of the uniquely assigned one of the at least one object is ascertained from the depth information; and, the motion-indicator for the at least one object is derived from at least one of the object contour and the object shape via a deep-learning algorithm by comparison with at least one of known object contours and object shapes.

10. The method of claim 8, wherein object points on the at least one object that have been imaged in the individual images are temporally tracked in order to derive the motion-indicator for the at least one object.

11. The method of claim 1, wherein the at least one overlay structure is displayed opaquely or at least partially transparently on the display device so that the at least one overlay structure completely or at least partially covers the panoramic image at least at one of on and adjacent to the uniquely assigned one of the at least one object.

12. The method of claim 1, wherein the display device exhibits display pixels and panoramic image points of the panoramic image are displayed on the display pixels of the display device; the at least one object contained in the panoramic image is represented on object pixels, wherein the object pixels are a subset of the display pixels; and, the overlay structure assigned to the uniquely assigned one of the at least one object is displayed at least at one of on and adjacent to the respective object pixels on the display device.

13. The method of claim 12, wherein an overlay image with the at least one overlay structure is superimposed on the panoramic image with the at least one object on the display device such that the overlay structure assigned to the uniquely assigned one of the at least one object is displayed on the display device at least at one of on and adjacent to the respective object pixels.

14. The method of claim 12, wherein the panoramic image contains the at least one overlay structure and the panoramic image is adapted therefor at least at one of at and adjacent to the panoramic image points on which the at least one object has been imaged such that the overlay structure assigned to the uniquely assigned one of the at least one object is displayed on the display device at least at one of on and adjacent to the respective object pixels.

15. The method of claim 1, wherein the at least two individual images, from which the depth information is ascertained by triangulation, are recorded by the same camera from at least two differing viewpoints, wherein the vehicle is moved so as to position the same camera at the at least two differing viewpoints; and, the depth information is ascertained by triangulation as a function of a base length between the at least two viewpoints.

16. The method of claim 1, wherein the environment is mapped within a panoramic region in the panoramic image; and, the panoramic region is larger than the fields of view of the individual cameras; a viewing angle of the panoramic region amounts to 360°; and, the panoramic image includes at least two individual images recorded at approximately a same time by differing cameras.

17. The method of claim 1, wherein isolines assigned to the vehicle are represented in the overlay structure on the display device; and, the isolines are displayed at fixed isodistances from a vehicle exterior of the vehicle.

18. A processing unit configured to carry out the method of claim 1.

19. A vehicle comprising:
at least two cameras each having a different field of view, wherein the fields of view of adjacent ones of said at least two cameras overlap at least in some regions;
a display device;
a processing unit as claimed in claim 18,
said display device being configured to represent a created panoramic image, containing at least one object, and at least one generated overlay structure such that the at least one overlay structure is displayed at least at one of on and adjacent to the uniquely assigned one of the at least one object.

20. The vehicle of claim 19, wherein the field of view of each of said at least two cameras has a viewing angle greater than or equal to 120°.

21. The vehicle of claim 19, wherein the field of view of each of said at least two cameras has a viewing angle greater than or equal to 170°.

* * * * *